UNITED STATES PATENT OFFICE.

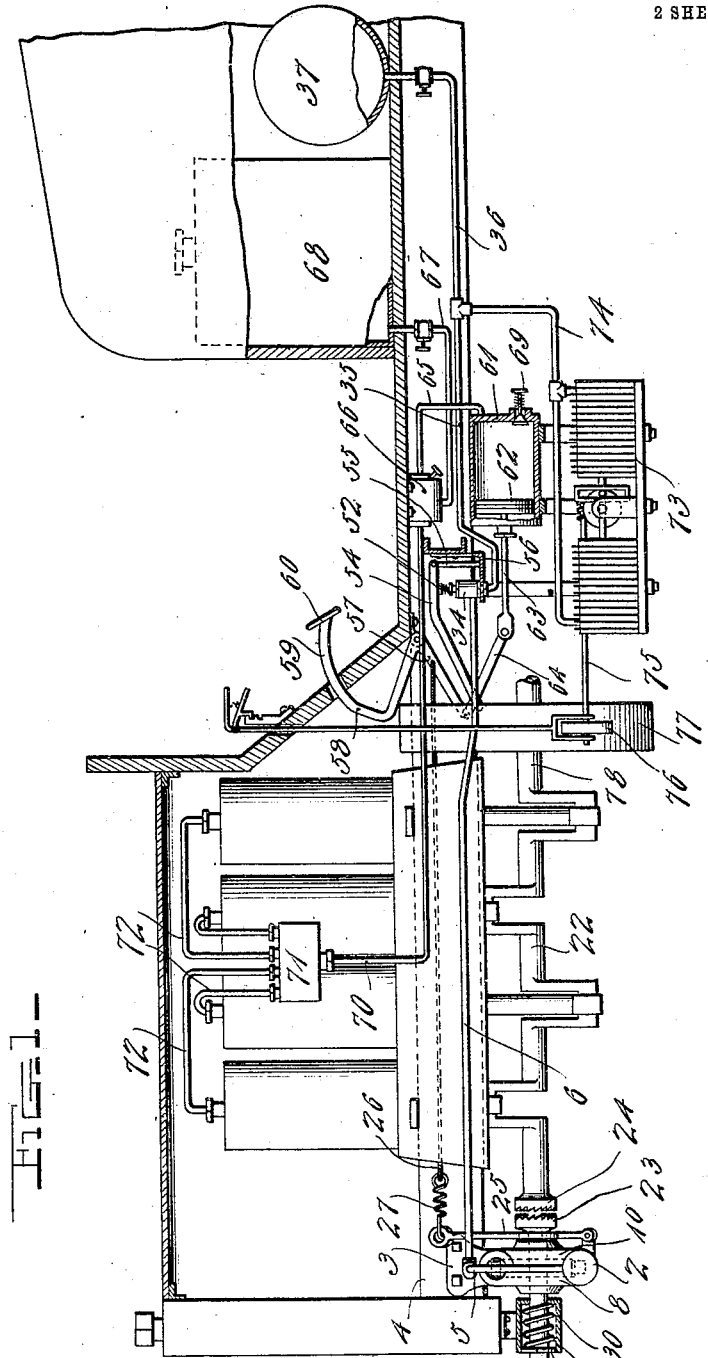

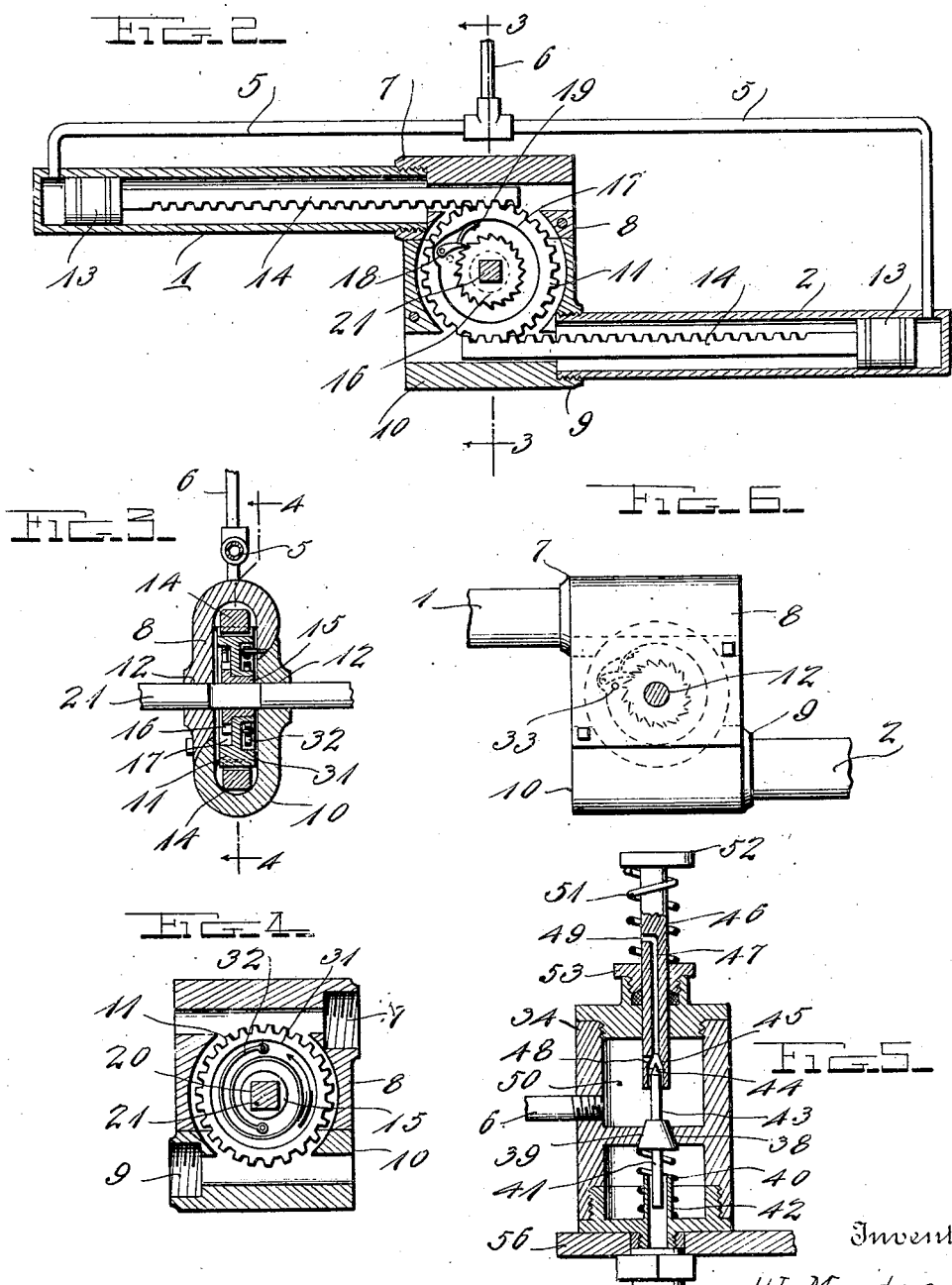

HERBERT L. MEEDER, OF COUNCIL BLUFFS, IOWA.

STARTING MECHANISM FOR EXPLOSIVE-ENGINES.

1,055,550.  Specification of Letters Patent.  Patented Mar. 11, 1913.

Application filed March 11, 1912. Serial No. 682,908.

*To all whom it may concern:*

Be it known that I, HERBERT L. MEEDER, a citizen of the United States, residing at Council Bluffs, in the county of Pottawattamie and State of Iowa, have invented certain new and useful Improvements in Starting Mechanism for Explosive-Engines; and I do declare the following to be a full, clear, and exact description of the invention, such as will enable others skilled in the art to which it appertains to make and use the same.

This invention relates to improvements in starting devices for explosive engines.

The objects of the invention are to provide an improved fluid pressure cranking mechanism for the engine shaft; to provide improved means for controlling the supply of the fluid pressure medium to the cranking device and its exhaust therefrom; and to provide means for simultaneously priming the engine cylinder, starting the cranking mechanism and connecting the same with the engine shaft.

With the above and other objects in view, the invention consists in the novel features of construction, and the combination and arrangement of parts hereinafter described and claimed.

In the accompanying drawings, Figure 1 is a side view partly in section of the front portion of an automobile showing the invention in position thereon; Fig. 2 is an enlarged central vertical section of the starting mechanism; Fig. 3 is a similar view taken at right angles to Fig. 1; Fig. 4 is a cross sectional view on the line 4—4 of Fig. 3 showing the rear side of the cranking gear; Fig. 5 is an enlarged vertical section through the air controlling valve of the starting mechanism. Fig. 6 is a front view of the supporting plates for the air cylinders of the starting mechanism showing the latter broken away and the cranking shaft in section.

My improved starting mechanism is herein shown and described as being applied to the shaft of an automobile engine and said mechanism comprises a pair of air or fluid pressure cylinders 1 and 2 which are spaced a suitable distance apart and are here shown as being secured to and supported by brackets 3 on the side bars 4 or other suitable part of the automobile frame. The cylinders have connected to their outer ends branch air or fluid conducting pipes 5 which connect with the main air or fluid conducting pipe 6 leading to a compressed air or fluid tank. The pipe 6 has arranged therein an air controlling valve which will be hereinafter described. The cylinders 1 and 2 are arranged in horizontal planes one above the other and spaced a suitable distance apart. The inner end of the cylinder 1 is suitably secured in a cylindrical socket 7 on the upper end of an outer gear supporting plate 8. The inner end of the cylinder 2 is secured in a socket 9 on the lower end of an inner gear supporting plate 10. The plates 8 and 10 form a head and are provided on their inner sides with annular recesses to receive a cranking gear 11 and also are provided with alined passages 12 to receive a cranking shaft hereinafter described.

Slidably mounted in the cylinders 1 and 2 are pistons 13 having piston rods 14 in the form of rack bars which are adapted to engage the teeth on the upper and lower sides of the gear 11 whereby when the pistons are projected by the admission of compressed air to the cylinders 1 and 2 the rack bars will revolve the gear 11 in the proper direction for cranking the engine shaft as will be hereinafter more fully described. The gear 11 is loosely mounted in the space between the recessed plates 8 and 10 on the hub 15 of a ratchet wheel or gear 16 arranged in the rear side of the cranking gear 11, said cranking gear being provided in its front side with an annular recess 17 to receive said ratchet gear. Pivoted in the recess 17 of the gear 11 is a pawl 18 which normally engages the teeth of the gear 16, said pawl being held in engagement with the said gear by a spring 19 as shown.

The hub 15 of the gear 16 is provided with a square bore 20 with which is engaged the outer portion of a short cranking shaft 21 the inner end of which terminates a short distance from the outer end of the engine shaft 22. On the inner end of the shaft 21 is arranged one member 23 of a clutch connection, the opposite member 24 of which is arranged on the adjacent end of the engine shaft whereby when said cranking shaft is shifted rearwardly, said clutch members will be brought into engagement and the cranking shaft 21 thus operatively connected with the engine shaft 22. The cranking shaft 21 is shifted to bring its clutch member into engagement with the clutch member on the engine shaft by a shifting lever 25 to the upper end of which is connected a wire cable 26 which extends back and is connected to an operating lever hereinafter described. The outer end of the cable 26 is connected to the lever 25 by a coiled spring 27 which will permit further movement of the operating lever after the shifting lever 25 has been actuated to bring the clutch members 23 and 24 into engagement.

The cranking shaft 21 extends forwardly through a casing 28 arranged on the bottom of the radiator of the automobile and at a suitable position on the shaft is secured the collar 29 between which and the end of the casing is arranged a coiled spring 30. By thus arranging the spring 30 the same will be compressed when the shaft 21 is shifted or drawn back by the cable 27 to engage the clutch member thereof with the clutch member 24 on the engine shaft so that when the cable 26 is released, the extension of said spring 30 will force the cranking shaft outwardly, thus disengaging the clutch member on the inner end thereof from the clutch member on the engine shaft. The forward end of the cranking shaft 21 is reduced and projects beyond the spring casing 28 to receive a wrench or crank handle whereby the crank shaft may be manually actuated for cranking the engine shaft when desired or, if for any reason the automatic cranking mechanism has become disabled.

In the rear side of the cranking gear 11 is an annular recess 31 in which is arranged a spiral spring 32 the inner end of which is secured to the hub of the gear 11 and the outer end of which is secured to the adjacent inner side of the inner gear supporting plate 10 whereby when the ratchet gear is turned by the cranking gear in the proper direction for cranking the engine shaft, said spring will be wound up. When the air is released from the cylinders 1 and 2 and the pressure of the rack bars on the cranking gear is thus removed, the spring 32 will uncoil and in thus uncoiling will turn the cranking gear back in a reverse direction thereby running the rack bars 14 and the pistons 13 back into the cylinders. In this retracting movement of the cranking gear 11 the pawl 18 will play loosely over the teeth of the ratchet 16 as will be readily understood.

In case the engine should back fire and to avoid any liability of breaking or damaging any of the parts of the operating mechanism by a retrograde movement of the engine shaft before the air has been released from the cylinders of the cranking mechanism, I provide means for throwing the cranking gear out of engagement or connection with the ratchet on the engine shaft, said mechanism comprising a stud 33 arranged on the inner side of the outer gear supporting-plate 8, said stud projecting inwardly in the path of movement of the pawl 18 of the cranking gear whereby when said gear is turned backward by the reverse movement of the engine shaft and ratchet 16, the pawl will be brought into engagement with the stud and will be thereby raised and disengaged from the teeth of the ratchet, thus disconnecting the latter from the cranking gear and permitting the engine shaft and ratchet to revolve without turning the cranking gear.

In order to control the supply of air to the cylinders 1 and 2 for operating the pistons 13 and rack bars 14, I provide a suitable air controlling valve comprising a casing 34 which is connected at its lower end by a branch supply pipe 35 to a main air conducting pipe 36 leading from a compressed air tank or reservoir 37 arranged in a suitable position in the automobile. In the casing 34 is arranged a valve seat 38 with which is engaged a valve 39 which controls the admission of the air to the valve casing and air conducting pipe 6 which is connected by the branch pipes 5 with the outer ends of the cylinders 1 and 2 as hereinbefore described. The valve 39 is normally held in engagement with its seat 38 to cut off the passage of the air to the pipes 6, by a coiled spring 40 which is arranged in the lower portion of the valve casing 34 and engages the lower side of the valve 39 as clearly shown in Fig. 5 of the drawings. The valve 39 is provided on its lower side with a short valve stem 41 which works in and is guided by a guide tube 42 arranged in the lower portion of the valve casing 34 and which is surrounded by the spring 40 as shown.

On the upper side of the valve 39 is an upwardly projecting stem 43 the upper end of which is of tapered or conical shape to provide an exhaust controlling valve 44 which projects into and is adapted to be engaged by a valve seat 45 formed in the lower end of a valve operating plunger 46 which is slidably mounted in the upper portion of the valve casing 34 as shown. The plunger 46 is provided with a central bore 47 the lower end of which communicates with the valve seat 45 and with a lower discharge port 48 in the lower end of the plunger, and at its upper end said bore communicates with an air discharging passage 49 in one side of the upper portion of the plunger. The lower portion of the plunger 46 and the stem 43 of the valve 39 work in an air chamber 50 formed in the central portion of the valve casing 34 and with which is connected the air conducting pipe 6. The plunger 46 is normally held in an elevated position with its seat 45 out of engagement with the valve 44 and its bore 47 and air ports 48 and 49 in open position by means of a coiled spring 51 arranged on the upper portion of the plunger between a shoulder 52 formed thereon and a stuffing box 53 on the upper end of the valve casing 34.

When the parts of the valve mechanism in the casing 34 are in their normal positions as just described the inlet or passage of air from the reservoir to the air conducting pipe 6 leading to the cranking cylinders is cut off, while the open position of the discharge ports in the plunger 46 permits the air from said cylinders to escape through the bore 47 of the plunger. When it is desired to admit air to the cranking cylinders for the purpose of operating the cranking shaft, the plunger 46 is depressed against the pressure of the spring 51. In the initial movement of the plunger, the valve seat 45 in the lower end thereof is brought into engagement with the valve 44 on the upper end of the stem 43 thereby closing the exhaust port 48 and the bore 47 in the plunger. The further downwardly movement of the plunger forces the valve 39 downwardly out of engagement with its seat 38 thereby admitting compressed air from the air tank or reservoir 37 through the branch pipe 35, said air passing through the chamber 50 in the valve casing 34 and into the pipe 6 through which it is conducted to the branch pipes 5 and by the same is conducted to the outer ends of the cylinders 1 and 2 where it acts upon the pistons to project the same and the rack bars outwardly in said cylinders thereby actuating the cranking gear and parts connected therewith as hereinbefore described. As soon as the engine shaft has thus been cranked, pressure is released from the plunger 46 whereupon the spring 51 thereof will immediately lift the plunger, thereby allowing the spring 40 to close the air inlet valve 39. When the piston is thus lifted the valve seat 45 will be disengaged from the valve 44 and the exhaust port 48 thus opened thereby permitting the air in the cranking cylinders and air conducting pipes 5 and 6 to escape through the bore 47 and upper exhaust port 49. When the air has thus been released the spiral spring 32 of the cranking gear 11 will revolve said gear in a reverse direction thereby forcing the pistons 13 and rack bars 14 back in the cylinders as has been previously described.

In order to permit the plunger 46 to be depressed by the operator when desired, I provide a valve operating mechanism comprising a plunger engaging lever 54 which is pivotally secured at one end in a standard 55 arranged on a bracket 56 which is secured to a suitable part of the frame of the machine and which also supports the valve casing 34. The lever 54 rests on or has its inner end engaged with the upper end of the plunger 46 and the outer end of said lever extends forward and is curved downwardly to a slight extent as shown. The free end of the lever 54 when thus arranged is in position to be engaged by the lower arm 57 of a bell crank lever 58 which is suitably mounted beneath the platform or bottom of the automobile. The upper arm of the bell crank lever is extended or has arranged thereon an upwardly and rearwardly projecting treadle bar 59 which works through a suitably arranged slot in the platform of the machine and has on its inner end a foot treadle 60 adapted to be engaged by the foot of the operator whereby the bell crank lever will be rocked when said treadle is depressed. When the bell crank lever is thus depressed the lower arm 57 thereof will be brought into engagement with the downwardly curved free end of the plunger depressing lever 54 thereby forcing said lever and plunger downwardly and opening the air inlet valve 39 and closing the exhaust valve 44 as hereinbefore described. When the bell crank lever 58 is actuated by the foot treadle to open the air controlling valve, the movement of the arm 57 of said lever will pull laterally upon the operating cable 26 attached to the shifting lever 25 of the cranking shaft thereby actuating said lever to engage the clutch members of the cranking shaft and engine shaft simultaneously with the opening of the air controlling valve. As hereinbefore stated the arrangement of the spring 27 in the cable 26 will permit further movement of the arm 57 of the bell crank lever 58 for the purpose of opening the air controlling valve and performing its other functions.

The foot treadle 60 and bell crank lever 58 in addition to opening the air inlet valve 39 and actuating the shifting mechanism of the cranking shaft also simultaneously actuates a priming mechanism for forcing a priming charge of gas into the cylinders of the engine. The priming mechanism comprises an air pressure cylinder 61 which is suitably arranged beneath the machine and has slidably mounted therein a piston 62 having a piston rod 63 projecting through one end of the cylinder. The outer end of the piston rod 63 is connected by a link or connecting rod 64 with the lower arm 57 of the bell crank lever whereby when said lever is rocked by the foot treadle 60, the piston will be forced back in the cylinder 61 thereby forcing a charge of air from the cylinder through an air conducting pipe 65 to a vaporizer 66 which is connected by a gasolene supply pipe 67 to a gasolene supply tank 68 arranged on the machine as shown. The cylinder 61 is provided with an air intake port in which is arranged a check valve 69 and whereby on the return movement of the piston a fresh charge of air will be drawn into the cylinder, to be forced out to the vaporizer on the next projection of the piston.

The vaporizer 66 may be of any suitable construction and the same together with the air and gasolene supply pipes leading thereto, are provided with suitable valves for controlling the flow of gasolene and air therethrough. The vaporizer is connected by a gas conducting pipe 70 to a suitable distributing device 71 which is connected by a series of valved fuel distributing pipes 72 to the cylinders of the engine.

In order to maintain a supply of air under proper pressure in the air reservoir 37, I provide a suitable air pump 73 which is shown conventionally in Fig. 1 of the drawings and is connected by air conducting pipes 74 with the air conducting pipe 36 leading from the air reservoir as shown. The pump 73 may be operated in any suitable manner but is here shown and is preferably driven by a suitable operating mechanism comprising a shaft 75 which is operatively connected at one end with the pump and is provided on its opposite end with a friction gear 76 adapted to be shifted into engagement with the fly wheel 77 on the drive shaft 78 of the engine.

Having thus described my invention, what I claim is;

1. In a starting device for explosive engines, detachably connected plates formed with bearing openings, gear receiving recesses and cylinder receiving sockets, fluid pressure cylinders arranged in said sockets and projecting in opposite directions, a cranking shaft, a gear operatively arranged thereon and disposed in said recesses of the plates, and pistons in said cylinders provided with racks engaging said gear at opposite points.

2. In an engine starting device, the combination of opposing plates detachably connected together and formed with bearing openings, gear receiving recesses and cylinder receiving sockets, fluid pressure cylinders arranged in said sockets and projecting in opposite directions in different planes, a ratchet wheel having a hub rotatably mounted in the bearing openings in said plates, a cranking shaft slidably but non-rotatably mounted in said hub, a gear rotatable on said hub and arranged in said recesses in the plates, a spring pressed pawl carried by the gear for engagement with said ratchet, a stud carried by one of said plates to co-act with said pawl to disengage the same from the ratchet, pistons in said cylinders and carrying racks to engage said gear at opposite points, a spring for rotating said gear in one direction, and means for admitting fluid under pressure to said cylinders.

3. In a starting device for explosive engines, the combination of a fluid pressure operated engine cranking mechanism, a clutch for connecting the same to the engine shaft, a valve for controlling the inlet of fluid under pressure to said cranking mechanism, a lever for operating said valve, a priming cylinder containing a piston for forcing the priming charge to the engine cylinder, and a foot lever adapted to have one end engage and operate said valve operating lever, a link connecting the foot lever to the rod of the piston in the priming cylinder, a lever for operating said clutch, and a yieldable connection between said clutch lever and said foot lever.

In testimony whereof I have hereunto set my hand in presence of two subscribing witnesses.

HERBERT L. MEEDER.

Witnesses:
CHAS. NICHOLSON.
E. E. LENBOW.